Sept. 1, 1931.  W. B. WHITNEY ET AL  1,820,927
MEANS FOR BREAKING ELECTRIC CIRCUITS
Filed April 28, 1925    6 Sheets-Sheet 1

Sept. 1, 1931.  W. B. WHITNEY ET AL  1,820,927
MEANS FOR BREAKING ELECTRIC CIRCUITS
Filed April 28, 1925   6 Sheets-Sheet 2

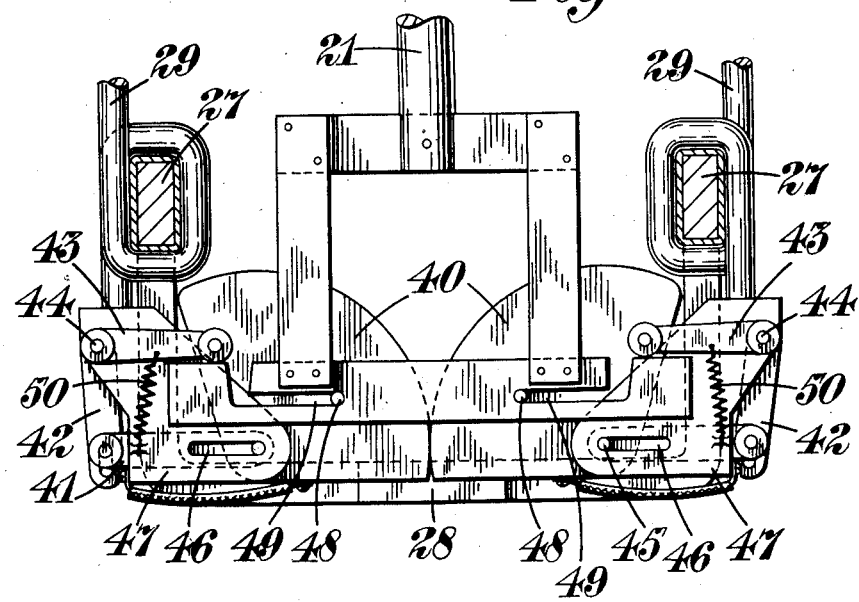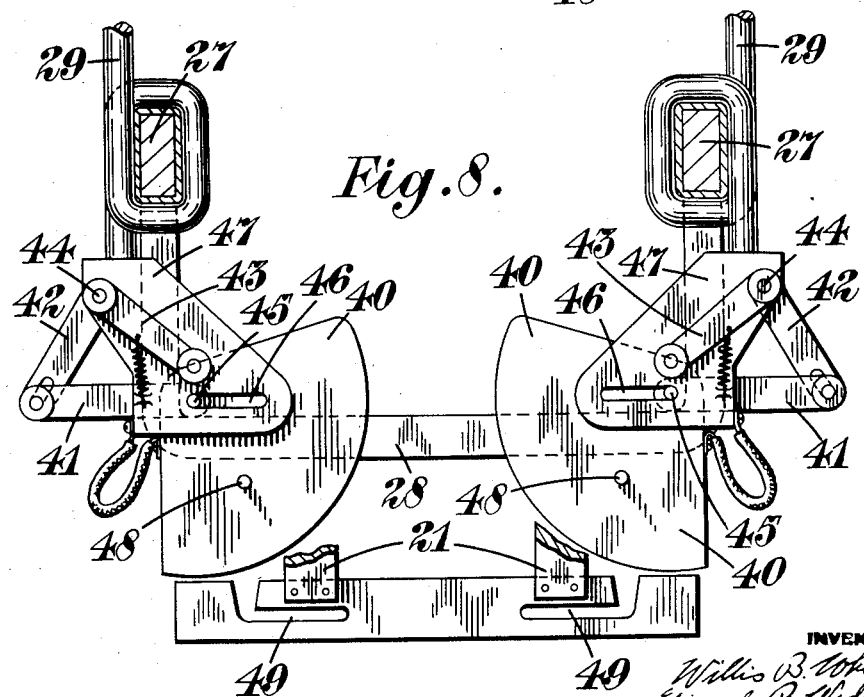

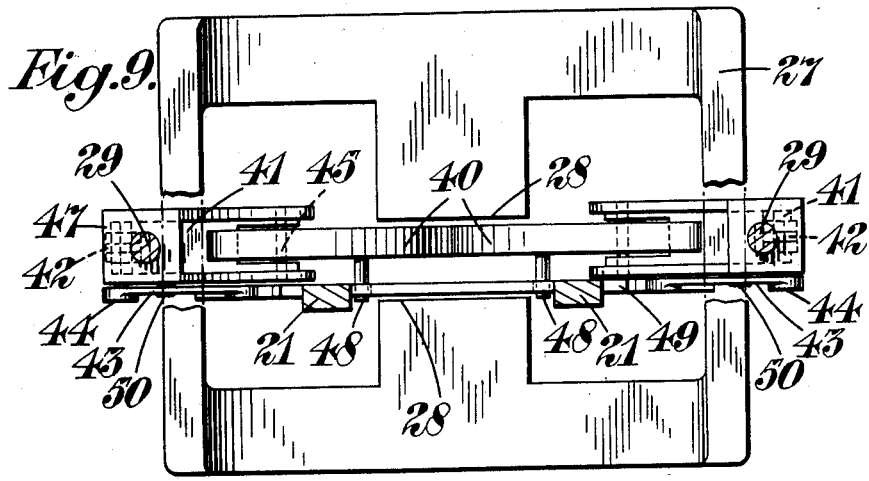
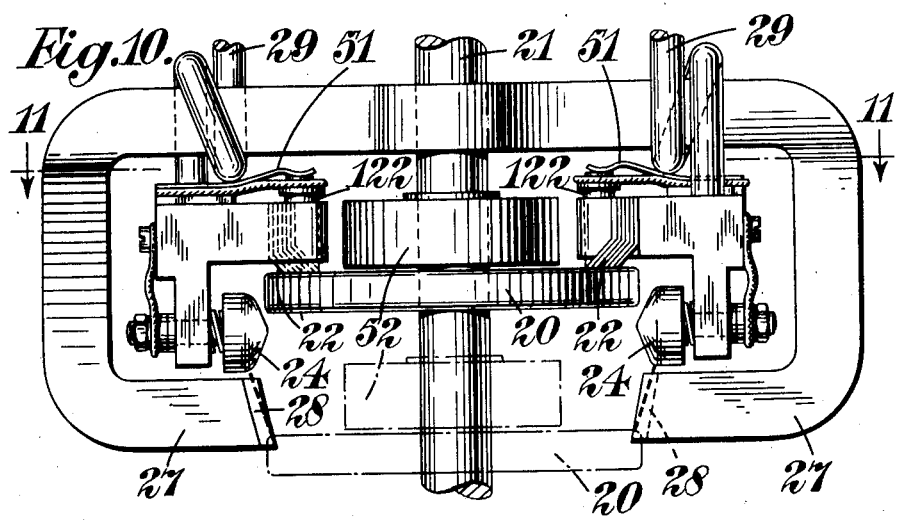
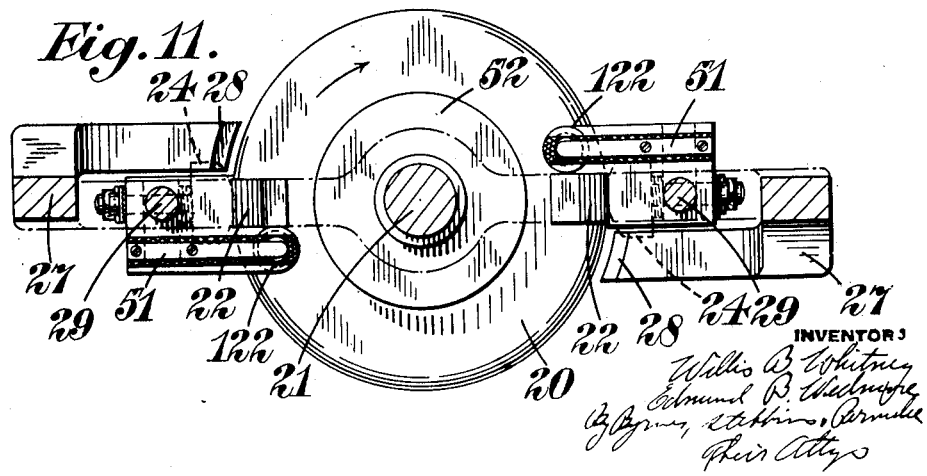

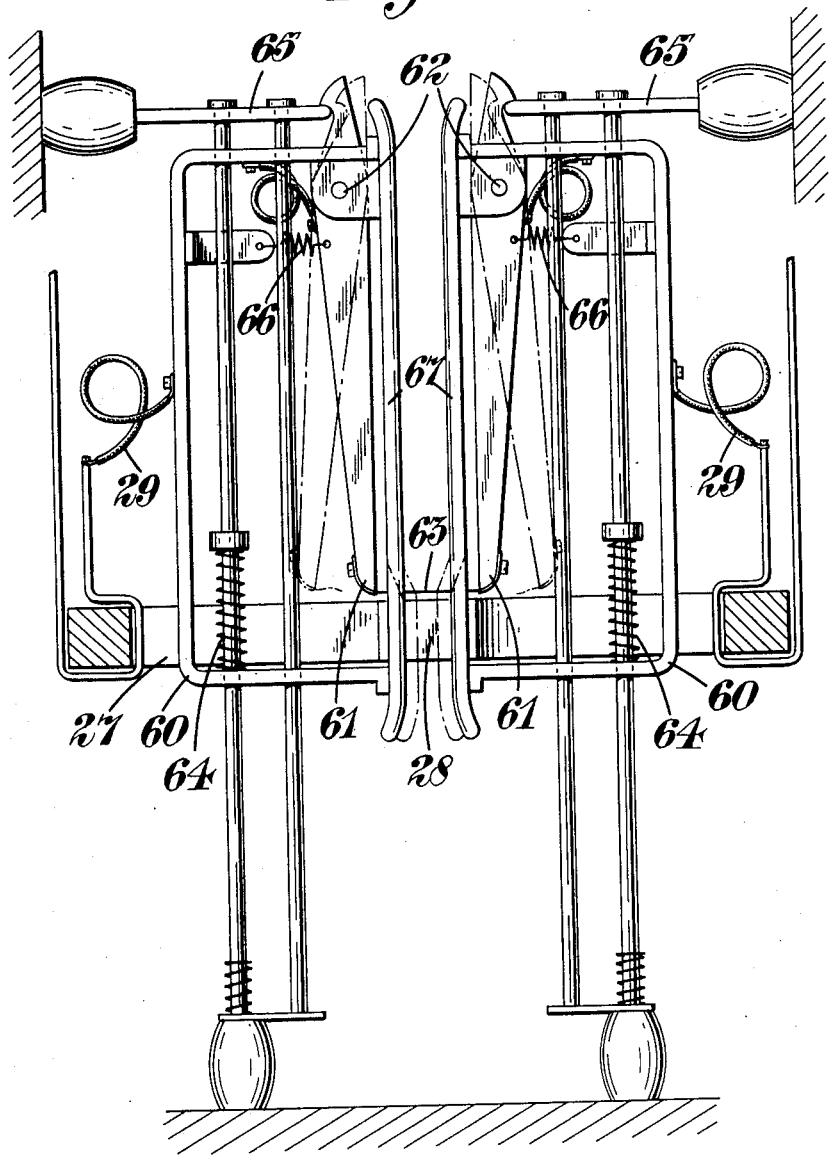

Sept. 1, 1931.   W. B. WHITNEY ET AL   1,820,927
MEANS FOR BREAKING ELECTRIC CIRCUITS
Filed April 28, 1925    6 Sheets-Sheet 6
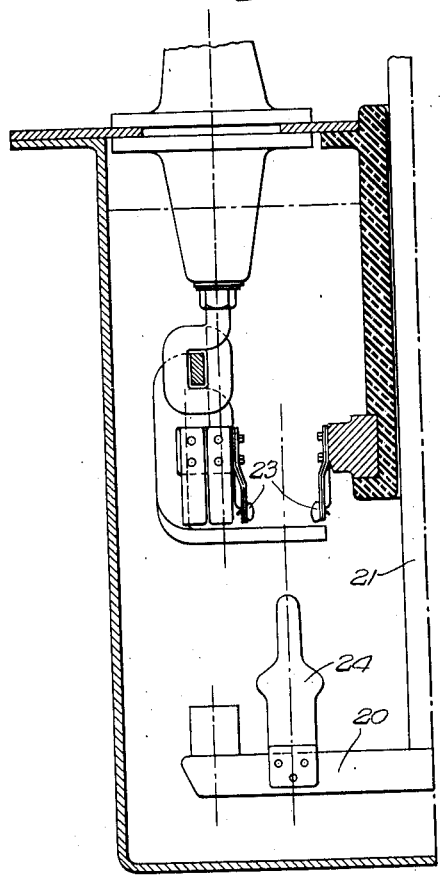
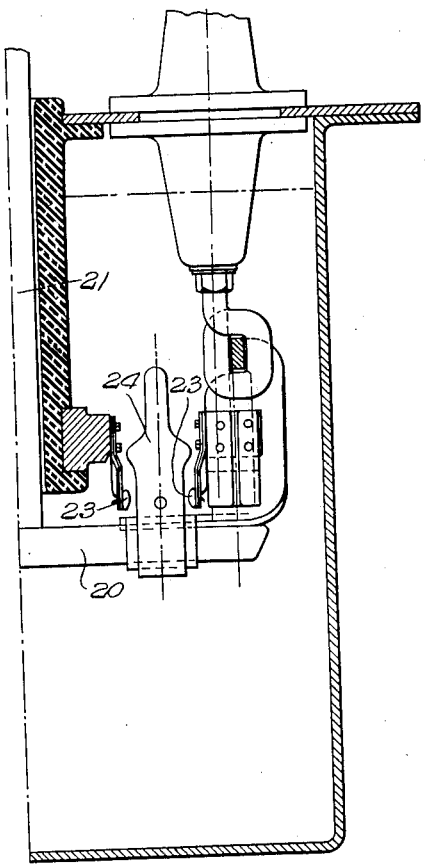
INVENTORS
Willis Bevan Whitney
Edmund Basil Wedmore
By Byrnes, Stebbins & Parmelee
Their attorneys.

Patented Sept. 1, 1931

1,820,927

UNITED STATES PATENT OFFICE

WILLIS BEVAN WHITNEY AND EDMUND BASIL WEDMORE, OF WESTMINSTER, LONDON, ENGLAND, ASSIGNORS TO THE BRITISH ELECTRICAL AND ALLIED INDUSTRIES RESEARCH ASSOCIATION, OF LONDON, ENGLAND, A BRITISH ASSOCIATION

MEANS FOR BREAKING ELECTRIC CIRCUITS

Application filed April 23, 1925, Serial No. 26,390, and in Great Britain September 5, 1924.

This invention relates to the quenching of arcs in liquid dielectrics for the purpose of breaking an alternating current circuit. Such conditions arise for example in circuit-breakers, switches, fuses and like devices, and in this specification the words "circuit-breaking means" are intended to cover all such devices when used on large power circuits such as commercial power circuits and the like, as distinct from circuits of small power in which although sparks are produced at the separating electrodes, there is little tendency for an arc to be set up between them.

Hitherto the methods usually employed in quenching such arcs have involved the drawing out of the arc, either by widely separating the electrodes or by the use of a magnetic "blow-out".

In the case of oil-immersed switches, as is well known, the energy liberated by the arc is sometimes so great, when heavy currents are involved, that the switch is damaged or destroyed and serious fires started. In breaking a circuit a certain minimum length of arc is necessary depending upon the condition of the circuit and upon the design of the apparatus. An excessive liberation of energy occurs when an arc is drawn out, either mechanically or by magnetic means, to a considerable length but the energy liberated when the arc is kept comparatively short is small in amount, and the object of this invention is to provide a method of and means for quenching an arc without relying to any material extent on a lengthening or drawing out of the arc.

Many devices exist in which the end of an arc is caused to travel over an electrode surface by immersion in an extensive magnetic field, or by strengthening the field behind the arc as it moves without moving the field relatively to the electrode. In all such arrangements the speed of movement of the end or root of the arc relative to the electrode surface is effected amongst other things by the magnitude of the current that happens to be flowing in the arc, and other chance factors enter as has been shown by high speed photographs of arcs on horns which reveal erratic movement of the roots, the root on one horn often lagging far behind the level reached by the root on the companion horn at a given instant. In other cases both roots are driven to the tips of the horns and form hot craters there while the body of the arc continues to extend in an uncontrolled manner by bowing and looping upwards in the space above the horns.

In the prior art where an arc has been immersed in an extended magnetic field in order to produce substantially continuous movement of an arc root over a previously cool surface, arrangements have been such that the body of the arc has been subjected to a force at least as great as that exerted on its roots and has been free to move in the extended field. Under such conditions the middle of the arc will move more readily than its roots and the arc will therefore be bowed out and greatly extended. One feature of our invention is the prevention of lengthening of the arc by this bowing whereby we insure that substantially all parts of a short fat arc are moved at the same speed relatively to at least one electrode. By employing two or more arcs in series the length of each in relation to its thickness is decreased and the reduction of bowing is further facilitated.

A further feature of our invention is that we definitely control the velocity of movement of the arc root in relation to the electrode surface, so that said velocity is substantially independent of the magnitude of the current flowing in the arc. This is particularly efficacious in oil, for example, where the barrier or wiping device may be substantially stationary with respect to the oil, and where the electrode is moved relatively thereto in such a manner as to force a movement of the arc root over the electrode surface in a controlled manner, enabling the designer to use whatever speed of relative movement he finds most effective, so that the arc root may be continually moved from a heated to a cooler region until the arc is finally extinguished. In addition, through having a controlled and calculable speed of relative movement, he is thereby also able to provide sufficient extension of electrode surface so as to ensure that the root shall never be moved to the end of the electrode before final arc extinction. Further, since the barrier or wiping device is in the form of a localized barrier, as for example, in the cases illustrated herein, a localized and highly concentrated magnetic field— the actual arc length is under much better control than in the ordinary case of the use of magnetic blow-outs which are designed to bow the whole arc, thereby often causing unnecessary length, output of arc energy, and generally uncontrolled movement.

According to the present invention, the method of quenching an alternating current arc in a liquid dielectric consist in causing relative movement between the "conducting path" and one or both of the electrodes without substantially lengthening the arc beyond the necessary minimum described herein and in such a manner that its end or ends are at a cool spot or spots on the electrode or electrodes at the time when the current reaches zero in its alternation, whereby the arc is hindered from restarting. By the words "conducting path" is meant that portion of the gases or vapour extending between the electrodes which is carrying or capable of carrying a current.

Said method brings about a condition under which the arc is less readily reformed after the current has reached zero in its alternation, and enables us under various circuit conditions of voltage and current to break the circuit with a much smaller separation of the electrodes than has hitherto been possible.

In determining the dimensions of an individual commercial design it will be understood that some factor of safety will be necessary dependent upon the reliability of the data upon which the design is based and this factor of safety will be taken into account in determining the minimum necessary dimensions.

This invention also covers circuit-breaking means for alternating currents comprising two electrodes immersed in a liquid dielectric, means for producing relative movement between the "conducting path" and one or both of the electrodes without substantially lengthening the arc beyond the necessary minimum herein described and in such manner that the end or ends of the "conducting path" are at a cool spot or spots on the electrode or electrodes at the time when the current reaches zero in its alternation.

The surface or surfaces between which the arc is formed may constitute parts of a switch or circuit breaker and the movement of these parts may be an intermittent one taking place only when the device is being operated to break the circuit or both at that time and also when the device is being reset.

According to a feature of the invention, in addition to means for imparting the required relative movement there is provided a magnetic device, such as a concentrated field, which is such as to prevent or tend to prevent the conducting path from travelling beyond a predetermined position in the direction in which the electrode or electrodes are relatively movable with respect to the conducting path.

The invention also includes the provision of a magnetic field to force the conducting path over the surface of one or both of the electrodes on to a relatively cold portion (or portions) thereof.

The speed of movement is sufficiently great that one or both extremities of the conducting path formed in one half cycle or in a pulsation of the alternating current will have travelled, before the arc is formed in a succeeding half cycle or pulsation from the hot spot (produced on one or both of the surfaces between which the arc passes in the first half cycle or pulsation) to a relatively cool part of the surface or surfaces. The term "pulsation" is intended to cover a rise and fall from and to zero of a current wave which on short circuit conditions may be substantially entirely on one side of the zero current-reference line.

It will be understood that the invention makes use of the feature that the arc starts considerably less readily from a cold surface than from a hot surface.

As previously stated the electrodes between which the arc will be formed are immersed in a liquid dielectric such as oil; and the means employed in accordance with the present invention is preferably such as to cause relative movement of (a) the electrode, with respect to the liquid and the arc; or (b) the arc, with respect to the electrode and the liquid.

Preferably the surfaces between which the arc is formed are separated prior to or during the aforesaid relative movement.

In order that the invention may be more readily understood several embodiments of the invention will now be described with the aid of the accompanying drawings which are diagrammatic only—not working drawings—and in which—

Figures 7 and 8 show respectively a modified construction of switch closed and open;

Figure 9 is a plan of the parts shown in Figure 7 with the leads broken away for clearness;

Figure 10 illustrates in elevation a further modification of switch;

Figure 11 is a section on the line 11—11 of Figure 10;

Figure 12 is an elevation of a still further modification of fuse switch according to the invention;

Figure 13 is a view partially in elevation and partially in section of a portion of a switch constructed in accordance with the showing in Figure 3 in an open position when mounted in a tank, and Figure 14 is a similar view showing the switch in its closed position.

Like reference numerals indicate like parts in the several figures of the drawings.

Figure 1:
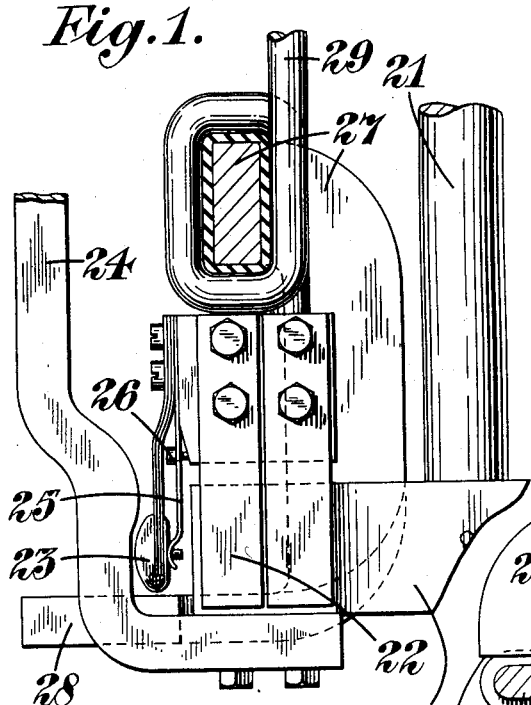
Figure 1 is an elevation of one half of a two-pole switch constructed according to the present invention and showing only those parts necessary to its understanding.
Figure 2:
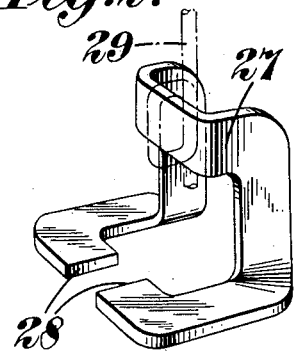
Figure 2 is a perspective view, drawn to a smaller scale, of the magnet employed in the construction illustrated in Figure 1.

Referring to Figures 1 and 2 the moving part of a main switch is shown at 20 and is movable with the main travel rod 21. A fixed main contact, cooperating with one end of the movable contact 20, is shown at 22 and on it is secured an auxiliary contact 23 spring pressed towards a movable auxiliary contact 24 by means of a spring 25. A stop 26 serves to limit the movement imparted by the spring 25. The movable auxiliary contact 24 is secured to and moves with the main contact 20. A magnet 27, of the form shown in Figure 2, comprises a body of magnet iron suitably insulated from the live parts of the switch with its opposed poles 28 spaced only a short distance apart beneath where the arc will form between the auxiliary electrodes 23, 24. A single turn (or more as required) from the main current-carrying lead 29 around the body of the magnet 27 is sufficient to produce an intense magnetic field to serve as a barrier which will prevent or tends to prevent the arc travelling downwardly past or through that field. The form of the magnet is such as to produce as little stray magnetic flux as possible.

It will be understood that for the other pole of the switch auxiliary contacts such as 23, 24 and a magnet such as 27 with a turn of the lead 29 round it will be provided.

In operation as the travel rod 21 is moved downwardly to open the switch the knees of the auxiliary contacts 24 will engage with the auxiliary contacts 23 before the main contacts 20 and 22 separate. The final break of the switch will therefore occur between the auxiliary contacts when the knees of the contacts 24 have passed the contacts 23 by which time the acceleration of the moving contacts will have become sufficiently great for the purpose of the present invention. The contacts 24 are extended in the direction of relative movement between them and the arcs. As the latter cannot travel beyond the region of the magnetic field between the poles 28 of the magnets 27, the contacts 24 will move past the arc so that the root of the latter will continually travel along the contacts 24 and on to cool surfaces thereof. It is found that the arcs by this means become quickly quenched especially when, as is intended in the present case, the contacts are immersed in oil or other suitable insulating liquid.

Figure 3:
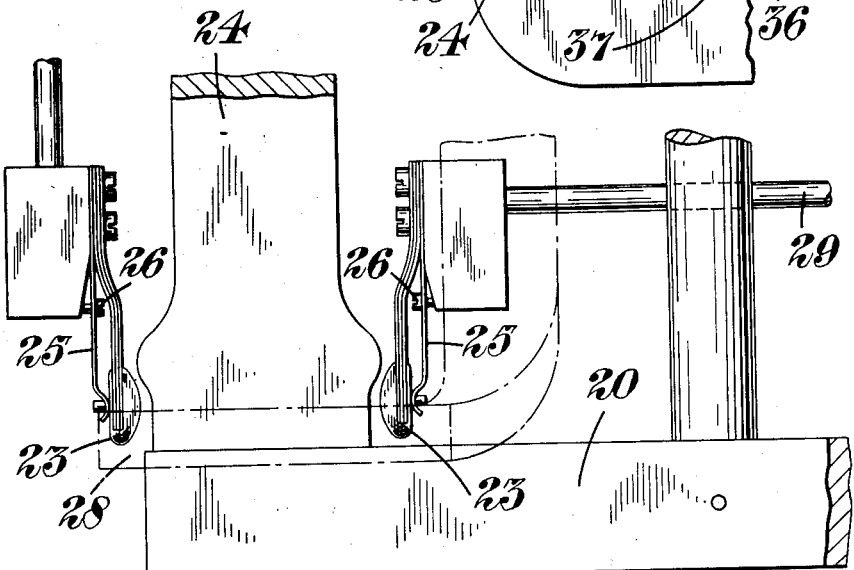
Figure 3 illustrates a modification of the switch shown in Figure 1.

In Figure 3 a switch, similar in its main essentials to that illustrated in Figures 1 and 2, is shown in which each auxiliary contact 24 of each pole of the switch is formed with two knees to co-operate with two auxiliary contacts 23 and is insulated from but moves with the main contact 20. In Figure 3 the main fixed contact 22 which co-operates with the left hand end of the member 20 has been omitted for the sake of clearness. Each of the auxiliary contacts 23 at the extreme ends of the bridging member or main contact 20 (it being understood that a portion of one pole only of the switch is shown) is electrically connected respectively to one of the two main fixed contacts 22 of the switch pole, while the inner auxiliary contacts 23 (one of which appears on the right hand side of the part 24 in Figure 3) are electrically connected together. Each of the main contacts 22 when the switch is closed makes contact respectively with an extension of the bridging member 20 but separates from it as the switch opens so that the current instead of entering by the main contact 22, say at the extreme right hand end of the member 20 and travelling along the latter to the contact 22 at the extreme left hand end of the member 20, is transferred to the auxiliary circuit by way of the parts 29, 23, 24. Thus, in the arrangement illustrated in Figure 3, there will be four auxiliary series breaks in each pole of the switch when the opening process carries the knees on each member 24 out of contact with the pair of contacts 23 which those knees co-operate.

Figure 6:
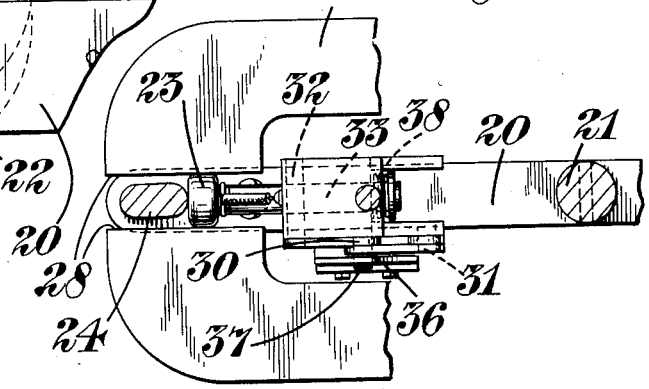
Figure 6 is a partial plan of the parts shown in Figure 4 to illustrate the form of magnet employed.
Figure 4:
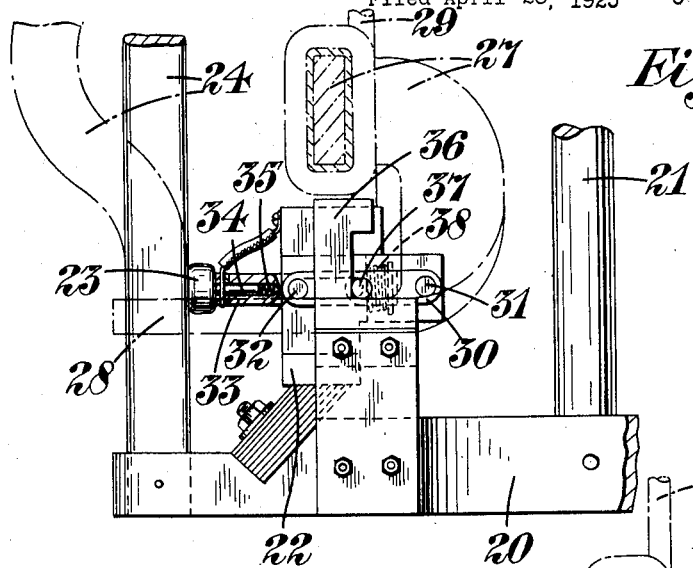
Figure 4 is a view similar to Figure 1 of a modified form of switch.
Figure 5:
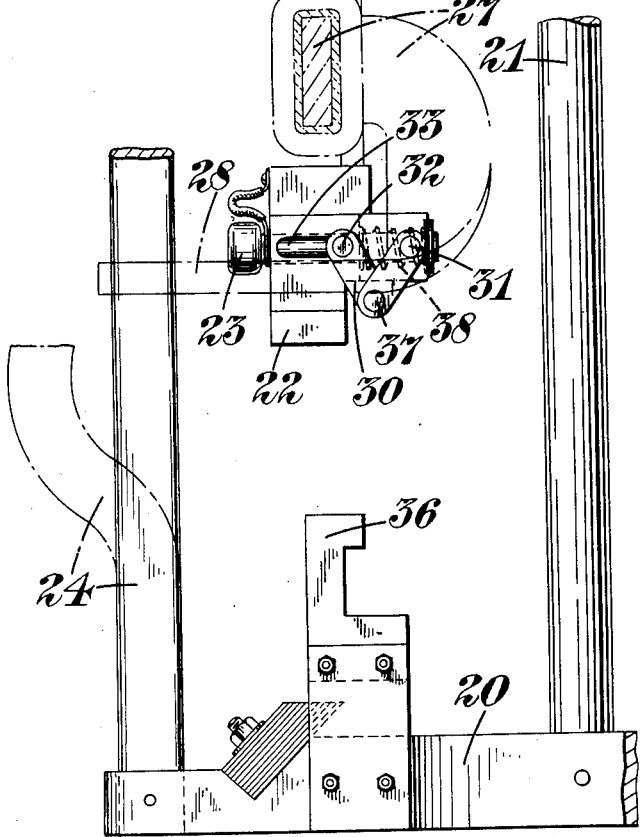
Figure 5 illustrates the action of the switch shown in Figure 4 with both main and auxiliary contacts separated.

In Figures 4 to 6 the auxiliary contact 24 is shown in full lines as a straight rod against which the movable auxiliary contact 23 is held by means of toggle arms 30 one of which is pivoted at 31 in a fixed part of the switch structure and the other of which, at 32, is pivotally connected to a sliding tubular guide 33 in which a spindle 34 (constituting an extension of the contact 23) is received. A spring 35 holds the contact 23 in firm engagement with the contact 24.

When the travel bar 21 and the main movable contact 20 are moved away from the main fixed contact 22, the auxiliary contacts 23 maintain engagement with the auxiliary contacts 24 until a tripping member 36, trips the toggle arms by engagement with a projection 37. A spring 38 in compression between a fixed part of the switch structure and a collar in the end of the guide 33, causes a quick break when the toggle centre is moved to the other side of the centre line of the toggle by the tripping member 36. As before an insulated magnet 27 is provided for the auxiliary breaks so as to provide a concentrated magnetic field which will prevent or tend to prevent the arc from passing through or beyond it.

The electrodes 24 may, however, be curved as shown in dotted lines.

In Figures 7, 8 and 9 a single break switch is illustrated in which the switch members or contacts comprise two sector-shaped parts 40 each pivotally mounted in a sliding arm 41. The outer end of each arm 41 is pivotally mounted in a slot at the end of one arm 42 of a bell-crank lever 42, 43 which is pivoted at 44 in a fixed member 47. Pivot pins 45 for the sectors 40 travel in slots 46 in fixed members 47 and other pins 48 extending from the sectors 40 are adapted to pass into slots 49 shaped as shown in the drawings. The slots 49 are formed in an extension of the insulated travel bar 21.

When the switch is closed the parts are in the position illustrated in Figure 7, in which the sectors 40 are held in contact to close the switch by the upward pressure exerted by the extension of the travel bar 21 on the arm 43 of each bell crank 42, 43. Movement of the travel bar 21 in a downward direction exerts pressure on the pins 48 to rotate the sectors about the pins 45, at the same time removing the upward pressure from the arms 43 so that springs 50 acting on these arms cause the separation of the sectors 40.

An insulated magnet 27 of the form shown in Figure 9 is again employed to produce an intense and localized magnetic field beneath the position at which the arc will be formed so as to impose a barrier to the downward travel of the latter.

In Figures 10 and 11 a further modified construction is shown in which auxiliary fixed contacts 24 are in the form of studs spring pressed radially in the direction of a metal disc 20 constituting the moving element of the main switch. In the closed position this disc engages two main contacts 122 which although they can travel downwardly under the action of springs 51 for a short distance, constitute the main fixed switch contacts. There are or may be other main fixed contacts 22 as in the previous cases.

The disc 20 is mounted on the travel rod 21 so as to be rotatable thereon or therewith and is associated with means, not illustrated in the drawings, by which it is caused to revolve about the axis of the travel rod 21 as the latter is moved downwardly.

The main contacts 122 do not break contact with the disc 20 until the latter has engaged the auxiliary contacts 24. Further travel, in a downward direction, of the disc 20 brings it to a position in which it will separate from the contacts 24 by which time the angular velocity of the disc 20 is sufficient for the purpose of the invention. The arc from each contact 24 is struck to the disc 20 and the rotation of the disc affords the relative movement between it and the arc. An insulated magnet 27 is so shaped, see Figure 10, that between each of its pole faces 28 and the adjacent periphery of a cylinder 52 of iron there will be an intense and localized magnetic field serving as a barrier to prevent or tend to prevent the arc from traveling round with the disc 20 when the latter rotates in the direction of the arrow shown in Figure 11.

It will be understood that the means for rotating the disc 20 do not come into operation until after the commencement of the movement to open the switch. The rotating means is such that the disc will be rotating as it passes the auxiliary contacts 24 and will be rotating at full speed when it reaches the full open position. This speed is maintained for at least $$\frac{1}{n}$$

second, where $n$ stands for the supply frequency.

The edge of the disc 20 may be perforated, or it may be formed as a number of separate segments supported by spider arms; or it may be formed in any other way which will prevent or tend to prevent undue suction on the gas bubble.

Figure 12 illustrates another form of the invention in which the main circuit is normally completed from the leads 29 through two frames 60 of conducting material, levers 61 also of conducting material (each pivoted at 62 in its frame 60) and a fusible element 63 joined across the lower ends of the levers 61.

Each of the frames 60 and the parts carried by it are electrically insulated, except for the fusible element 63, from the companion frame and its parts. Each frame is normally pressed in a downward direction by strong compression springs 64 and when the fusible element 63 is intact the frames are supported in the position illustrated in Figure 12 by hooked extremities of the levers 61 engaging with insulated supports 65.

When the fusible element is ruptured the levers 61 move to the position shown in chain lines under the action of springs 66 thereby disengaging their hooked extremities from the supports 65. The frames 60 are propelled downwardly by the springs 64 and the arc, which is started by the rupturing of the fuse, is established across two contact members 67—one on each frame. These contact members travel down with the frames 60 and an insulated magnet 27 having a form similar for example to that shown in Figure 9, provides an intense local field across its pole faces 28 beneath the position at which the arc is started. The magnetic barrier is therefore provided beneath the arc to prevent or tend to prevent it travelling downwardly and to ensure that the members 67 move past the roots of the arc.

In the several switches described, the full advantage of the relative movement, transversely to the length of the arc, may not be obtained until the full open position is reached. With an alternating current this may occur just after the most favourable point for rupture in a totally unsymmetrical wave has been reached. Hence the arc may hang on for a $$\text{time} = \frac{1}{n},$$

during which time relative movement must be provided, where $n$ stands for the supply frequency.

The extension of the electrode surfaces in the forms illustrated in Figures 1 to 11 in the direction of relative movement (or in the case of an inclined or splayed electrode as illustrated in some of the figures, the length of the projection of that electrode in a plane normal to the length of the arc) should preferably not be less than the distance given by the following formula:—

Where $l = v\ (t - 1/n)$ in the case of alternating currents.

$l$ for example in the case of Figure 1 being measured vertically upwards from the point on 24 at which arcing first starts.

$v =$ (in the case of Figure 1) the mean velocity of vertical movement of the cross bar (20) measured during the time $t - 1/n$.

$n =$ the supply frequency in cycles per second.

$t =$ in the case of Figure 1, the time during which the gap between 23 and 24 is increasing in the horizontal direction (noting that the gap may in other cases be greater than is shown in Figure 1).

The above formula applies to a switch or circuit breaker for use with an alternating current when the electrode surfaces are immersed in a liquid dielectric such as oil.

In the fuse-switch shown in Figure 12 $t$, in the formula above set out, will be the time taken between the breaking of the fusible element and the starting of the arc between the electrode surfaces 67.

It is found in practice that when using a magnetic barrier with a switch similar to that illustrated in Figure 1 with only a single break the following values have given good results:—

Flux density between pole faces = 11,000 lines per square centimetre at the peak of a 5000 R. M. S. ampere wave.

Area of pole faces = 2" wide × 1" deep.

Speed of relative movement between contact surface of the auxiliary contact such as 24 and the arc, in a direction transverse to the length of the arc = 100 centimetres per second approx.

Total length of arc gap 3.5 centimetres approx.

With the above values it is found that a single phase alternating current circuit can be broken in which the E. M. F. is 5000 volts R. M. S. value and the circuit is carrying 10,000 k. v. a. when the contacts separate, the short-circuit current then being approximately 2000 R. M. S. amperes. The arc is rapidly quenched with the liberation of only a small amount of energy relatively to the amount of energy usually liberated in a switch when breaking such a circuit.

For higher voltages the values given for the gap will probably increase proportionately. It is believed that the length of the arc gap may be decreased with an increase of the relative speed of movement between the arc and the contacts.

The arrangement of the magnet must be such that the field which it produces does not produce any material "blow-out" effect on the body of the arc.

In the construction illustrated in Figure 12, or in constructions in which between both electrode surfaces (between which the arc is formed) and the arc there is relative movement in the same direction, some advantage may be obtained when the members 67 are backed, for a short distance, say 1", from their lower ends with iron or other magnetizable material, to force the arc over the electrode surfaces without appreciably lengthening the arc; and $v$ in this case in the formula given above will be the speed of relative movement between the arc root and the electrode, taking into account the speed with which the arc is positively moved by the action of the magnetizable material and also any speed of movement of the electrode.

By splaying the auxiliary electrode as described, or by moving the electrodes as, for example in the manner described in Figures 8 and 9 or Figures 10 and 11, the electrode surface is moved so as to tend to remove it bodily out from the gas bubble in the direction of the arc axis, by the action of the relative transverse movement.

In Figures 13 and 14, a switch of the form shown in Figure 3 is shown mounted in a tank containing an insulating fluid, such as oil, the level of which is indicated by broken lines. In Figure 13, the switch is in its open or circuit interrupting position. In Figure 14 the switch is in its closed position. It is to be understood that Figures 13 and 14 illustrate only half a switch as the parts shown in these figures are duplicated on opposite sides of the rod 21.

Although in the drawings a means for providing a magnetic field has been shown in all cases, the invention is not limited to the use of such means and switches or circuit breakers may be employed, according to this invention, devoid of a magnetic barrier to limit, or to tend to limit the movement of the arc, or to actually move the arc in respect of the electrode surfaces.

Various forms of the invention have been described in detail in order to indicate some of the many ways in which the invention can be put into practice; but it is to be understood that the invention is not limited to the details described.

In Figure 3 one form of multiple break for one side of the switch has been illustrated; but the number of such breaks may be increased to any extent that may be found desirable. It will be seen that by the present invention the arc is quenched without substantially lengthening it after the necessary minimum arc length has been obtained, for example, by means of the curvature of the electrode, such as 24. In some of the examples illustrated a slight lengthening, however, may occur during the time in which there is relative movement between the arc and the electrodes due either to mechanical or magnetic conditions or both; but the design and intention of the construction illustrated is that this lengthening shall be as little as possible. Where it is stated in the specification or the claims that there is substantially no lengthening of the arc it is to be understood that the slight lengthening above mentioned is excepted. In contradistinction to the present invention the current practice in the art is to employ means for purposely lengthening the arc either mechanically or magnetically, or both mechanically and magnetically, this being done for the purpose of effecting rupture of the arc.

We claim:

1. An alternating current circuit breaker comprising electrodes which are bridged by an arc on breaking circuit and of which at least one has a surface transverse to the length of the arc which prior to breaking circuit extends a substantial distance on at least one side thereof, means for producing a locally concentrated magnetic field situated to the opposite side of the arc and directed so as to oppose entry of the arc into said field, and means for producing movement of said electrode relatively to said field so that the arc bearing surface moves towards the latter so as to move the arc root on said electrode continuously to a cool surface thereof.

2. An alternating current circuit breaker comprising a container for insulating liquid, electrodes which are bridged by an arc on breaking circuit and of which at least one has a surface transverse to the length of the arc which prior to breaking circuit extends a substantial distance on at least one side thereof, means for producing a locally concentrated magnetic field situated to the opposite side of the arc directed so as to oppose entry of the arc into said field and remaining stationary in relation to the container, and means for producing movement of said electrode relatively to said field so that the arc bearing surface moves towards the latter so as to move the arc root on said electrode continuously to a cool surface thereof.

3. An alternating current circuit breaker comprising electrodes which are bridged by an arc on breaking circuit and of which at least one has a surface transverse to the length of the arc which prior to breaking circuit extends a substantial distance on at least one side thereof, an electro-magnet comprising a metallic flux path having pole pieces arranged to produce a locally concentrated magnetic field situated to the opposite side of the arc and directed so as to oppose entry of the arc into said field and means for producing movement of said electrode relatively to said field so that the arc bearing surface moves towards the latter so as to move the arc root on said electrode continuously to a cool surface thereof.

4. An alternating current circuit breaker comprising electrodes which are bridged by an arc on breaking circuit and of which at least has a surface transverse to the length of the arc which prior to breaking circuit extends a substantial distance on at least one side thereof, an electro-magnet comprising a metallic flux path having pole pieces arranged to produce a locally concentrated magnetic field situated to the opposite side of the arc and directed so as to oppose entry of the arc into said field and means for producing movement of said electrode relatively to said field so that the arc bearing surface moves towards the latter, the opposed surfaces of the pole pieces being of elongated form and thin in the direction of movement of the electrode.

5. An alternating current circuit breaker comprising electrodes between which an arc is formed on breaking circuit which are relatively movable in a direction transverse to the length of the arc and of which one has a surface which prior to breaking circuit extends a substantial distance on at least one side of the point of formation of the arc substantially in the direction in which the other moves relatively to it, means for producing a locally concentrated magnetic field situated to the opposite side of the arc directed so as to oppose entry of the arc into said field and remaining stationary with respect to said other electrode.

6. An alternating current circuit breaker comprising electrodes between which an arc is formed on breaking circuit, which are relatively movable in a direction transverse to the length of the arc and of which one has a surface which prior to breaking circuit extends a substantial distance on at least one side of the point of formation of the arc substantially in the direction in which the other moves relatively to it, means for producing a locally concentrated magnetic field situated to the opposite side of the shortest gap between the electrodes and directed so as to oppose entry of the arc into said field and remaining stationary with respect to said other electrode, said movement being such that the shortest gap between the electrodes also remains substantially in the neighbourhood of said field.

7. An alternating current circuit breaker comprising electrodes between which an arc is formed on breaking circuit which are relatively movable in a direction transverse to the length of the arc and of which one has a surface which prior to breaking circuit extends a substantial distance on at least one side of the point of formation of the arc substantially in the direction in which the other moves relatively to it, means for producing a locally concentrated magnetic field situated to the opposite side of the arc directed so as to oppose entry of the arc into said field and remaining stationary with respect to said other electrode and means for initiating said relative movement in a direction transverse to the length of the arc and thereafter effecting a separating movement of the electrodes to a preferred gap.

8. An alternating current circuit breaker comprising electrodes between which an arc is formed on breaking circuit which are relatively movable in a direction transverse to the length of the arc and of which one has a surface which prior to breaking circuit extends a substantial distance on at least one side of the point of formation of the arc in the direction in which the other moves relatively to it but sloping away from said other electrode and thereafter has a surface extending parallel to the direction of relative movement, means for producing a locally concentrated magnetic field situated to the opposite side of the arc directed so as to oppose entry of the arc into said field and remaining stationary with respect to said other electrode.

9. An alternating current circuit breaker comprising electrodes between which an arc is formed on breaking circuit, which are relatively movable in a direction transverse to the length of the arc and of which one has a surface which prior to breaking circuit extends a substantial distance on at least one side of the point of formation of the arc substantially in the direction in which the other moves relatively to it, means for producing a locally concentrated magnetic field situated to the opposite side of the arc directed so as to oppose entry of the arc into said field and remaining stationary with respect to said other electrode, the extended electrode being of such length in relation to its speed of movement that the arc root will remain on its surface at least until the first passage of the current through zero after the full gap has been attained.

10. An alternating current circuit breaker comprising electrodes which are bridged by an arc on breaking circuit and of which at least one has a surface transverse to the length of the arc, which prior to breaking circuit extends a substantial distance on at least one side thereof, means for producing a locally concentrated magnetic field situated to the opposite side of the arc and directed so as to oppose entry of the arc into said field, and means for producing movement of said electrode relatively to said field so that the arc bearing surface moves towards the latter, wherein a current carrying portion of at least one electrode extends from the neighbourhood of the arc in a direction away from the field thereby urging the arc towards the field.

11. An alternating current circuit breaker comprising electrodes which are bridged by an arc on breaking circuit and of which at least one has a surface transverse to the length of the arc which prior to breaking circuit extends a substantial distance on at least one side thereof, an electro-magnet connected in series with said electrodes for producing a locally concentrated magnetic field situated to the opposite side of the arc and directed so as to oppose entry of the arc into said field, and means for producing movement of said electrode relatively to said fields so that the arc bearing surface moves towards the latter so as to move the arc root on said electrode continuously to a cool surface thereof.

12. An alternating current circuit breaker comprising electrodes between which an arc is formed on breaking circuit which are relatively movable in a direction transverse to the length of the arc, and of which one has a surface which prior to breaking circuit extends a substantial distance on at least one side of the point of formation of the arc substantially in the direction in which the other moves relatively to it, means for producing a locally concentrated magnetic field situated to the opposite side of the arc directed so as to oppose entry of the arc into said field and remaining stationary with respect to said other electrode and means for initiating said relative movement in a direction transverse to the length of the arc and effecting a separating movement of the electrodes to a preferred gap not greater than 1 cm. per 1500 volts.

In testimony whereof we have signed our names to this specification.

WILLIS BEVAN WHITNEY.
EDMUND BASIL WEDMORE.